(12) United States Patent
Dick

(10) Patent No.: US 7,278,769 B2
(45) Date of Patent: Oct. 9, 2007

(54) LIGHT-EMITTING DEVICE

(76) Inventor: Adam Dick, 24 St. Anthony Street, Chatham, Ontario (CA) N7M 3X8

( * ) Notice: Subject to any disclaimer, the term of this patent is extended or adjusted under 35 U.S.C. 154(b) by 0 days.

(21) Appl. No.: 11/300,509

(22) Filed: Dec. 15, 2005

(65) Prior Publication Data

US 2007/0139951 A1    Jun. 21, 2007

(51) Int. Cl.
*F21L 4/00* (2006.01)
(52) U.S. Cl. ............... 362/553; 362/558; 362/259; 362/577; 362/120; 362/124
(58) Field of Classification Search ............. 362/553, 362/558–560, 565, 582, 551, 259, 577, 109, 362/119–120, 124, 311
See application file for complete search history.

(56) References Cited

U.S. PATENT DOCUMENTS

| | | |
|---|---|---|
| 5,036,442 A | 7/1991 | Brown |
| 5,079,679 A | 1/1992 | Chin-Fa |
| 5,279,513 A | 1/1994 | Connelly |
| 5,392,203 A | 2/1995 | Harris, Jr. |
| 6,086,218 A | 7/2000 | Robertson |
| 6,244,723 B1 | 6/2001 | Talamo |
| 6,280,063 B1 | 8/2001 | Fong et al. |
| 6,293,684 B1 | 9/2001 | Riblett |
| 6,337,946 B1 * | 1/2002 | McGaffigan ............... 385/146 |
| 6,612,712 B2 | 9/2003 | Nepil |
| 6,835,440 B1 | 12/2004 | Konishi et al. |
| 2002/0114168 A1 * | 8/2002 | Pelka et al. ................ 362/555 |

* cited by examiner

*Primary Examiner*—Laura Tso
(74) *Attorney, Agent, or Firm*—Bereskin & Parr

(57) ABSTRACT

Coherent light, as produced by lasers, is much more intense and bright than non-coherent light. However, unlike non-coherent light sources coherent light from a laser does not radiate away from its source in a spherical fashion, but instead travels in a substantially straight path directly away from the source in a unidirectional beam. Direct exposure to coherent light is potentially dangerous to the human eye and consumer products employing laser-light sources are carefully regulated. Consequently, as a result of the radiation characteristics of coherent light, coherent light sources have not previously been employed for use in a signaling wand or any other direct-lighting apparatus. In contrast to the prior art, embodiments of the present invention provides an apparatus for emitting intense non-coherent light derived from a coherent light source (e.g. laser).

11 Claims, 3 Drawing Sheets

LIGHT-EMITTING DEVICE

FIELD OF THE INVENTION

The invention relates to illumination devices, and, in particular to an apparatus for diffusing and dispersing non-coherent light from a coherent light source.

BACKGROUND OF THE INVENTION

The prior art is replete with light assemblies specifically designed for particular lighting needs and specialized applications. For example, light assemblies such as signaling wands are used for directing automobile traffic and by ground crews at airports to direct and position aircrafts. Emergency services (e.g police and fire departments, military and coast guard, etc.) also use signaling wands and similar devices for managing crowds and signaling directives to coordinate activities.

Early signaling wands were crude adaptations of flashlights that employed incandescent light-bulbs to illuminate a plastic tube-like structure. More recent signaling wands employ Light Emitting Diodes (LEDs) in place of incandescent light-bulbs. Examples include U.S. Pat. Nos. 5,079,679 (to Chin-Fa), 5,392,203 (to Harris, Jr.), 6,293,684 (to Riblett, E. L.) and 6,612,712 (to Nepil). Both incandescent light-bulbs and LEDs produce non-coherent light that is inherently limited in terms of both brightness and intensity.

By contrast, coherent light, as produced by lasers, is much more intense and bright than non-coherent light. However, unlike non-coherent light, coherent light from a laser does not radiate away from a source in a spherical fashion, but instead travels in a substantially straight path directly away from the source in a unidirectional beam. Direct exposure to coherent light is potentially dangerous to the human eye and consumer products employing laser-light sources are carefully regulated. Consequently, as a result of the radiation characteristics of coherent light, coherent light sources have not previously been employed for use in a signaling wand or any other direct-lighting apparatus.

SUMMARY OF THE INVENTION

According to an aspect of an embodiment of the invention there is provided a light-emitting device comprising: a coherent light source; and, a light-diffusing portion having an input for receiving coherent light from the coherent light source and a substantially opaque section opposite the input for preventing coherent light from exiting the light-diffusing portion, the light-diffusing portion sufficient for diffusing and emitting diffused non-coherent light derived from the coherent light provided by the coherent light source.

In some embodiments the light-diffusing portion is comprised of a solidified homogeneous optical polymer resin or other suitable optical material with sufficient refractive index (>=1.3).

In some embodiments the light-diffusing portion further comprises a tubular body, and wherein the input for receiving coherent light is on one end of the tubular body and the substantially opaque section is on the other end of the tubular body.

In some embodiments the substantially opaque section is reflective and causes light to be reflected back into the light-diffusing portion. In some more specific embodiments, the opaque section is comprised of at least one of a reflective foil and a reflective paint.

In some embodiments the light-diffusing portion also includes a cap connectable directly opposite the input for receiving the coherent light from the coherent light source. In some more specific embodiments, the cap comprises at least a portion of the substantially opaque section.

In some embodiments the light-emitting device also includes a translucent exterior case surrounding the light-diffusing portion In some embodiments the light-diffusing portion is provided as a decorative form.

In some embodiments the light diffusing portion is in the form of a road pylon.

In some embodiments the light-emitting device also includes a fiber optic cable connected between the coherent light source and the light-diffusing portion.

According to another aspect of an embodiment of the invention there is provided a light-emitting device comprising: a coherent light source; and, a light-diffusing portion having an input for receiving coherent light from the coherent light source and a section opposite the input adapted to prevent substantial amounts of coherent light from exiting the light-diffusing portion, the light diffusing portion sufficient for diffusing and emitting diffused light derived from the coherent light provided by the coherent light source.

According to yet another aspect of an embodiment of the invention there is provided a light-emitting device comprising: a coherent light source; an optical splitter connectable to receive coherent light from the coherent light source, and wherein the optical splitter is provided for dividing a coherent light beam into a plurality of coherent light beams; a plurality of optical fibers connectable to the optical splitters to receive the respective plurality of coherent light beams; and, a plurality of light-diffusing portions connectable to the plurality of optical fibers, wherein each light-diffusing portion has an input for receiving a respective one of the plurality of coherent light beams and a section opposite the input adapted to prevent substantial amounts of coherent light from exiting the light-diffusing portion, the light diffusing portion sufficient for diffusing and emitting diffused light derived from the coherent light provided by the coherent light source.

Other aspects and features of the present invention will become apparent, to those ordinarily skilled in the art, upon review of the following description of the specific embodiments of the invention.

BRIEF DESCRIPTION OF THE DRAWINGS

For a better understanding of the present invention, and to show more clearly how it may be carried into effect, reference will now be made, by way of example, to the accompanying drawings, which illustrate aspects of embodiments of the present invention and in which.

DETAILED DESCRIPTION OF THE INVENTION

Prior art signaling wands are generally crude adaptations of flash-lights that employ either incandescent light-bulbs or Light Emitting Diodes (LEDs). Both incandescent light-bulbs and LEDs produce non-coherent light that is inherently limited in terms of both brightness and intensity. On the other hand, coherent light, as produced by lasers, is much more intense and bright than non-coherent light. However, unlike non-coherent light, coherent light from a laser does not radiate away from a source in a spherical fashion, but instead travels in a substantially straight path directly away from the source in a unidirectional beam. Direct exposure to coherent light is potentially dangerous to the human eye and consumer products employing laser-light sources are carefully regulated. Consequently, as a result of the radiation characteristics of coherent light, coherent light sources have not previously been employed for use in a signaling wand or any other direct-lighting apparatus.

In contrast to the prior art, embodiments of the present invention provide a light-emitting device including a coherent light source (e.g. a laser) and a light-diffusing portion for diffusing and emitting diffused non-coherent light derived from the coherent light source and substantially preventing coherent light from exiting the light-diffusing portion. More specifically, the light-diffusing portion has an input for receiving coherent light from the coherent light source and a section opposite the input point for preventing coherent light from exiting the light-diffusing portion.

Figure 1:
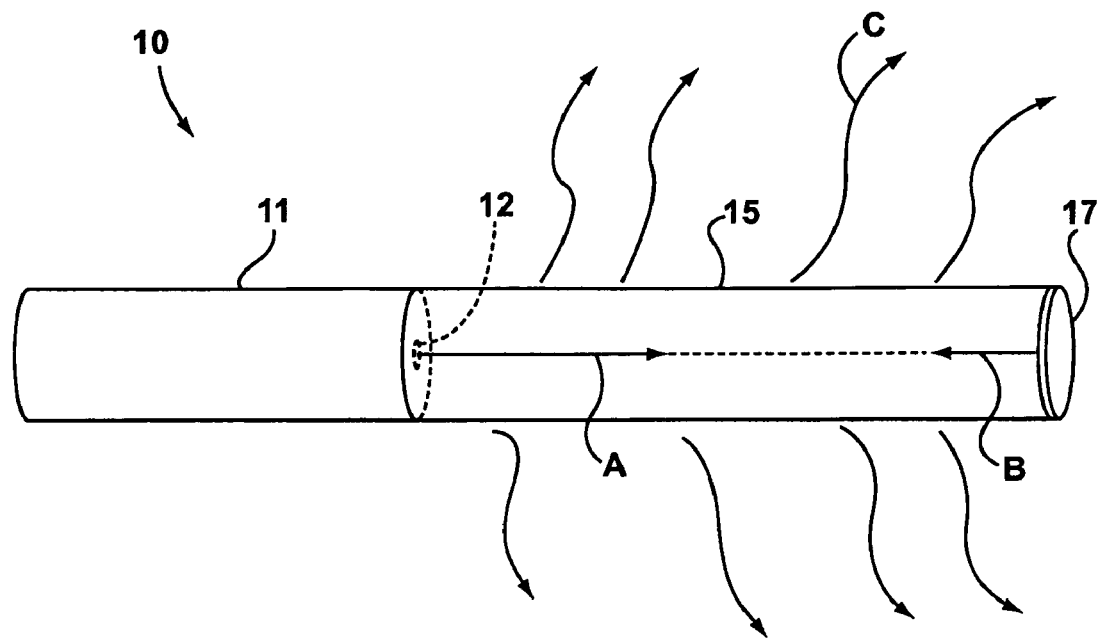
FIG. 1 is a simplified schematic drawing of a light-emitting device according to a first embodiment of the invention.

Referring to FIG. 1, shown is a simplified schematic drawing of a light-emitting device 10 according to a first embodiment of the invention suitable for use as a signaling wand. The light-emitting device 10 includes a coherent light source 11 (e.g. a laser) and a light-diffusing portion 15 for receiving coherent light from the coherent light source 11, diffusing the coherent light and emitting diffused non-coherent light.

In some embodiments the coherent light source 11 is a laser light source suitable to produce laser light of a particular color (e.g. red, blue, green, purple, etc). The coherent light source 11 includes an emission point 12 from which coherent light is emitted. Those skilled in the art will also appreciate that the coherent light source 11 also includes a suitable combination of supporting components, such a power supply (e.g. a battery pack, wall-plug and/or the like), an on/off switch and a handle, which are not shown for the sake of brevity.

As shown in FIG. 1, the light-diffusing portion 15 is cylindrical and is made from a solidified homogeneous polymer resin or other suitable optical material with sufficient refractive index (>=1.3) that is either translucent or substantially transparent and suitable for diffusing non-coherent light in the azimuthal direction relative to the direction of travel of a coherent light beam. One end of the light-diffusing portion 15, serving as the coherent light input point, abuts and joins the coherent light source 11. The other end of the light-diffusing portion 15 includes a substantially opaque section 17, which is arranged to be opposite the emission point 12 of the coherent light source 11.

The substantially opaque section 17 is provided to prevent substantial amounts of coherent light from exiting the light-diffusing portion 15 via a path opposite to the coherent light input. In some embodiments at least small amounts of light will travel through the substantially opaque section 17. In some embodiments, the substantially opaque section 17 is provided as an end cap (see FIG. 2), paint, a film, or adhesive tape sufficient for blocking the transmission of coherent light. In some embodiments, the substantially opaque section 17 is made by sintering, melting, scraping or otherwise damaging a section of the light-diffusing portion 15. Additionally and/or alternatively, in some embodiments the substantially opaque section 17 is also reflective, so as to direct light back into the light-diffusing portion 15.

In operation, coherent light, illustrated as primary beam A, from the coherent light source 11 is emitted into the light-diffusing portion 15 via the emission point 12. As the primary beam A travels through the length of the light-diffusing portion 15, the primary beam A is at least partially diffused by the solidified homogenous polymer resin or other suitable optical material making up the light-diffusing portion 15. As a result, diffused (or scattered) light, illustrated as scattered beams C, is produced and emitted in the azimuthal direction relative to the direction of travel of the primary beam A. Upon reaching the end of the light-diffusing portion 15 the primary beam A also encounters the substantially opaque section 17 where it is either absorbed or reflected depending on the specific characteristics of the substantially opaque section 17 in a particular embodiment. However, irrespective of the embodiment, the opaque section 17 serves to significantly block the transmission of coherent light outside the light-diffusing portion 15. When the substantially opaque section 17 is reflective, the primary beam A is reflected back towards the coherent light source 11, as is illustrated by secondary beam B, which may further diffuse and be emitted as scattered light beams C.

Figure 2:
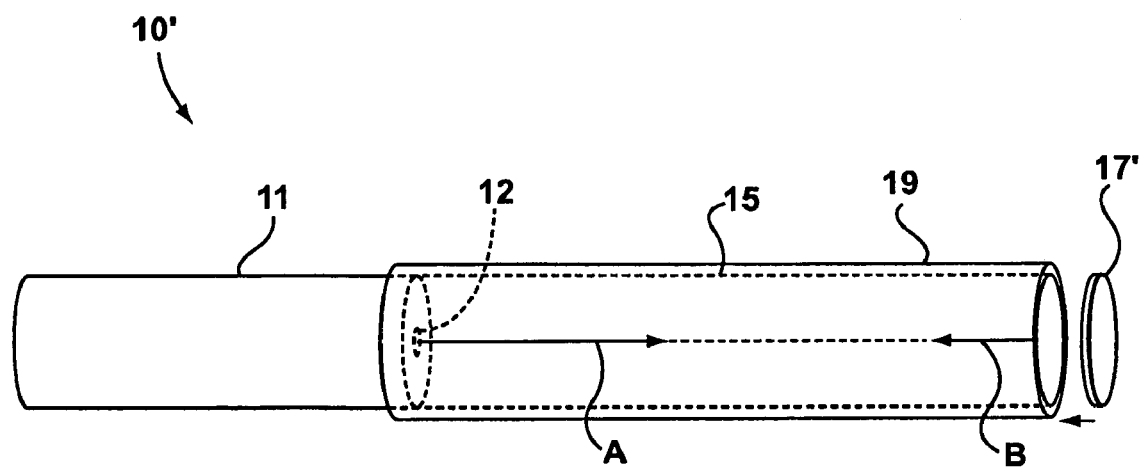
FIG. 2 is a simplified schematic drawing of the light-emitting device shown in FIG. 1 further adapted in accordance with another embodiment of the invention.

Referring to FIG. 2, shown is an illustration of a modified light-emitting device 10'. The modified light-emitting device 10' illustrated in FIG. 2 is similar to the light-emitting device 10 illustrated in FIG. 1, and accordingly, elements common to both share common reference numerals. The primary difference, illustrated in FIG. 2, is that the modified light-emitting device 10' includes an exterior casing 19 surrounding the light-diffusing portion 15. Moreover, the substantially opaque section 17 is specifically provided as a substantially opaque end-cap 17' that is fitted to cover the end of the light-diffusing portion 15 opposite the coherent light input of the light-diffusing portion 15 so as to prevent the transmission of coherent light outside the light-diffusing portion 15 as described above. Additionally and/or alternatively, a portion (e.g. a face) of the substantially opaque end-cap 17' may also be reflective, so that in operation coherent light is reflected back towards the coherent light source 11 as described above.

In some embodiments, the exterior casing 19 is either translucent or substantially transparent. The exterior casing 19 may be provided for a number of reasons, including—but not limited to—providing the light-diffusing portion with a protective sheath, joining and/or sealing the coherent light source 11 with the light-diffusing portion 15 and serving as a changeable colored sheath for decorative and/or signaling purposes.

Figure 3:
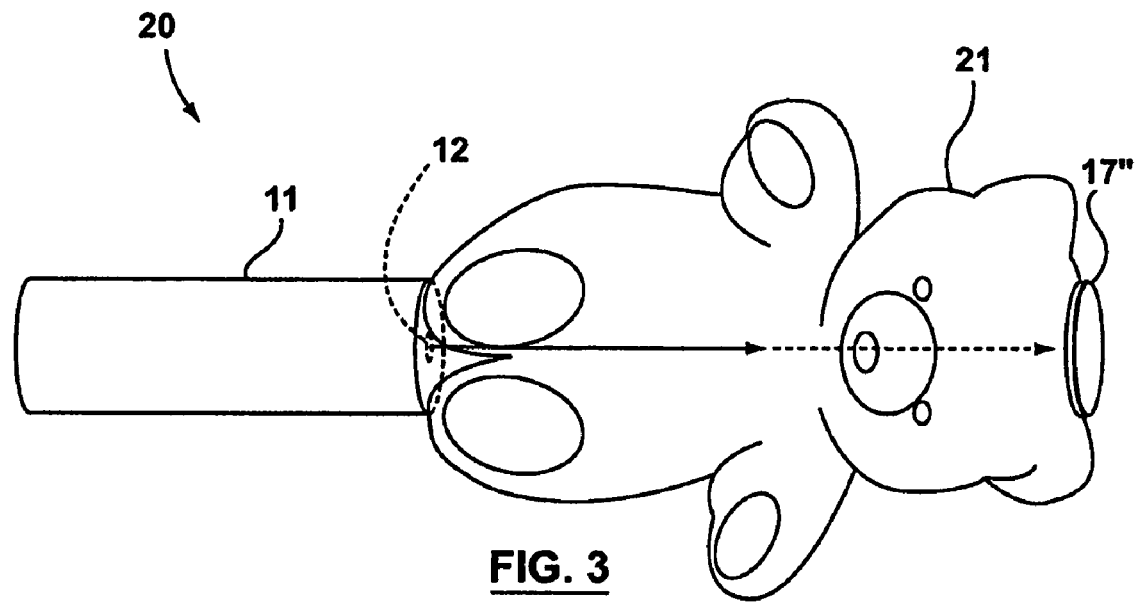
FIG. 3 is a simplified schematic drawing of a light-emitting device according to a second embodiment of the invention.

Referring to FIG. 3, shown is a simplified schematic drawing of a light-emitting device 20 according to a second embodiment of the invention. The light-emitting device 20 illustrated in FIG. 3 is similar to the light-emitting device 10 illustrated in FIG. 1, and accordingly, elements common to both share common reference numerals. The primary difference, illustrated in FIG. 3, is that the light-emitting device 20 is provided as a decorative object, and accordingly, the cylindrical light-diffusing portion 15 shown in FIG. 1 has been replaced with a light-diffusing decorative object 21.

Figure 4:
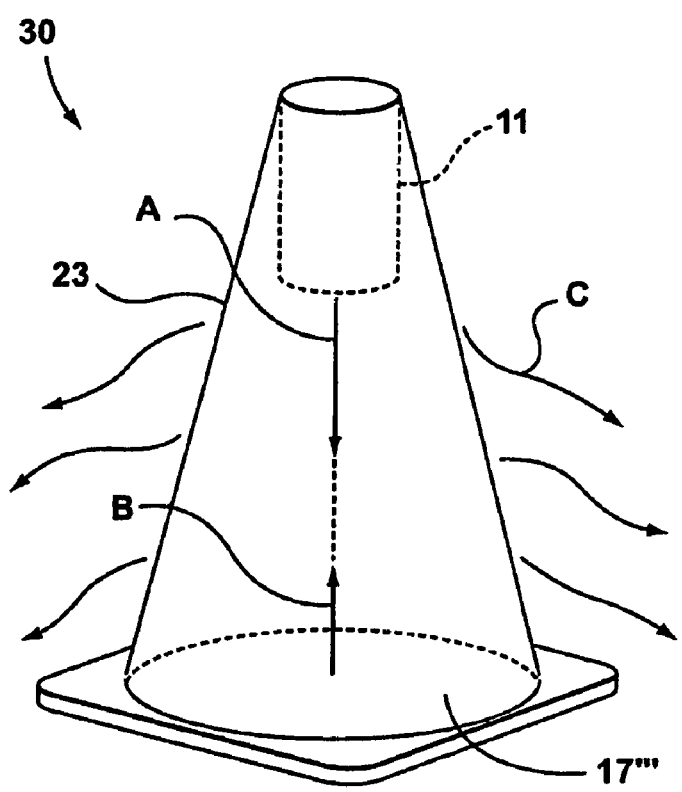
FIG. 4 is a simplified schematic drawing of a light-emitting device according to a third embodiment of the invention.

Referring to FIG. 4, shown is a simplified schematic drawing of a light-emitting device 30 according to a third embodiment of the invention. The light-emitting device 30 illustrated in FIG. 4 is similar to the light-emitting device 10 illustrated in FIG. 1, and accordingly, elements common to both share common reference numerals. The primary difference, illustrated in FIG. 4, is that the light-emitting device 30 is provided to serve as a light-emitting pylon as opposed to a signaling wand. Accordingly, the cylindrical light-diffusing portion 15 shown in FIG. 1 has been replaced with a light-diffusing pylon 23. Additionally and/or alternatively, the opaque base 17''' is provided as a coating of paint or film or by sintering, melting, scraping or otherwise damaging a section of the pylon 23. Additionally and/or alternatively, in other embodiments the light-diffusing pylon is replaced by other shapes (e.g. a tiger drum).

Figure 5:
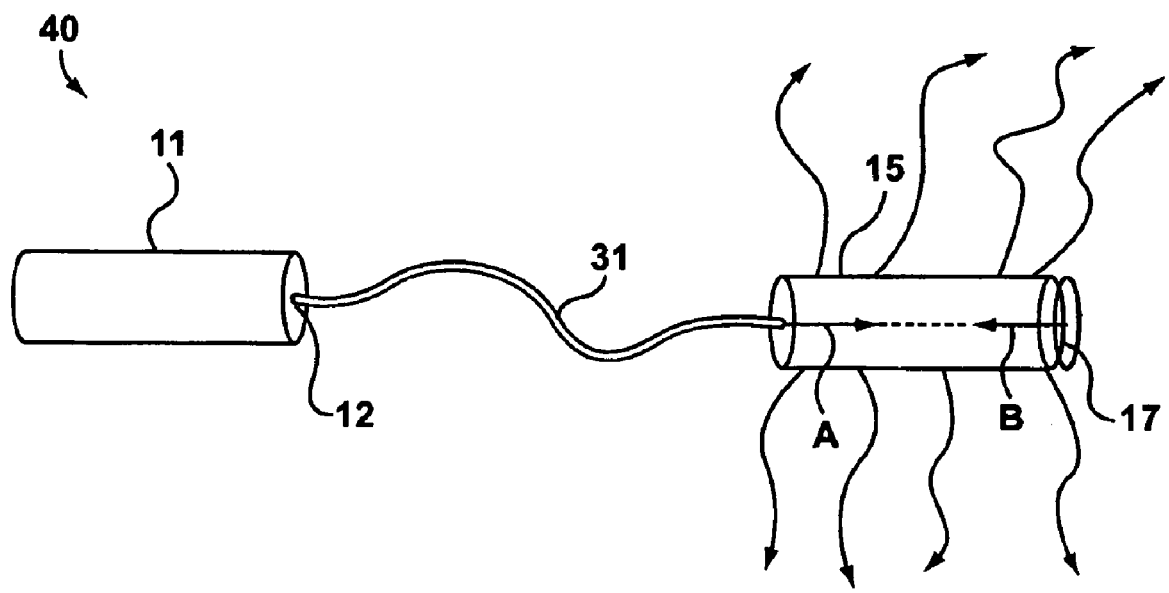
FIG. 5 is a simplified schematic drawing of a light-emitting device according to a fourth embodiment of the invention.

Referring to FIG. 5, shown is a simplified schematic drawing of a light-emitting device 40 according to a fourth embodiment of the invention. The light-emitting device 40 illustrated in FIG. 5 is similar to the light-emitting device 10 illustrated in FIG. 1, and accordingly, elements common to both share common reference numerals. The primary difference, illustrated in FIG. 5, is that the coherent light source 11 is connected to the light diffusing portion 15 via a fiber optic cable 31 of arbitrary length. The fiber optic cable 31 serves to substantially carry the coherent light generated by the coherent light source 11 to the input point 12 of the light diffusing portion 15 some distance away. The length of fiber optic cable appropriate for a given application depends upon several factors including but not limited to: the power of the coherent light source, the intended application, and the specific optical transmissivity of the optical fiber utilized.

Figure 6:
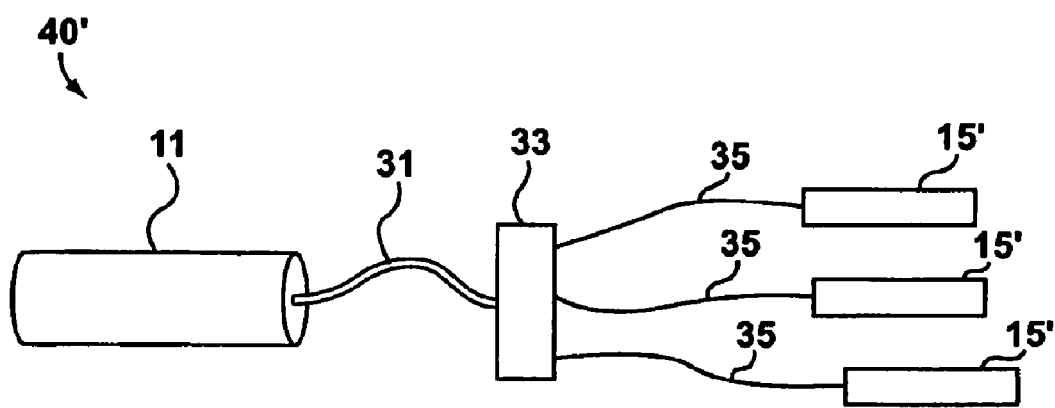
FIG. 6 is a simplified schematic drawing of the light-emitting device shown in FIG. 5 further adapted in accordance with another embodiment of the invention.

Referring to FIG. 6, shown is a simplified schematic drawing of a light-emitting device 40' according to a fifth embodiment of the invention. The light-emitting device 40' illustrated in FIG. 5 is similar to the light-emitting device 40 illustrated in FIG. 5, and accordingly, elements common to both share common reference numerals. The primary difference, illustrated in FIG. 6, is that the fiber optic cable 31 reaches an optical splitter 33, which divides the coherent light from the coherent light source 11 into a number of optical streams transmitted into a respective number of tributary optical fibers 35. The tributary optical fibers 35 terminate at the input points of an arbitrary number of light diffusing portions 15'. The number of fiber optic cables appropriate for a given application depends upon several factors including but not limited to: the power of the coherent light source, the optical splitter characteristics, the intended application, and the specific optical transmissivity of the optical fibers utilized.

While the above description provides example embodiments, it will be appreciated that the present invention is susceptible to modification and change without departing from the fair meaning and scope of the accompanying claims. Accordingly, what has been described is merely illustrative of the application of aspects of embodiments of the invention and numerous modifications and variations of the present invention are possible in light of the above teachings.

I claim:

1. A light-emitting device comprising:
   a coherent light source;
   a light-diffusing portion having an input for receiving coherent light from the coherent light source and a substantially opaque section opposite the input for preventing coherent light from exiting the light-diffusing portion, the light-diffusing portion sufficient for diffusing and emitting diffused non-coherent light derived from the coherent light provided by the coherent light source; and
   a translucent exterior case surrounding the light-diffusing portion.

2. A light-emitting device according to claim 1, wherein the light-diffusing portion is comprised of a solidified homogeneous optical polymer resin with a refractive index greater or equal to 1.3.

3. A light-emitting device according to claim 1, wherein the light-diffusing portion further comprises a tubular body, and wherein the input for receiving coherent light is on one end of the tubular body and the substantially opaque section is on the other end of the tubular body.

4. A light-emitting device according to claim 1, wherein the substantially opaque section is reflective and causes light to be reflected back into the light-diffusing portion.

5. A light-emitting device according to claim 4, wherein the opaque section is comprised of at least one of a reflective foil and a reflective paint.

6. A light-emitting device according to claim 1 further comprising a cap connectable directly opposite the input for receiving the coherent light from the coherent light source.

7. A light-emitting device according to claim 6, wherein the cap comprises at least a portion of the substantially opaque section.

8. A light-emitting device according to claim 1, wherein the light-diffusing portion is provided as a decorative form.

9. A light-emitting device according to claim 1 wherein the light diffusing portion is in the form of a road pylon.

10. A light-emitting device according to claim 1, further comprising a fiber optic cable connected between the coherent light source and the light-diffusing portion.

11. A light-emitting device comprising:
    a coherent light source;
    an optical splitter connectable to receive coherent light from the coherent light source, and wherein the optical splitter is provided for dividing a coherent light beam into a plurality of coherent light beams;
    a plurality of optical fibers connectable to the optical splitters to receive the respective plurality of coherent light beams; and
    a plurality of light-diffusing portions connectable to the plurality of optical fibers, wherein each light-diffusing portion has an input for receiving a respective one of the plurality of coherent light beams and a section opposite the input adapted to prevent substantial amounts of coherent light from exiting the light-diffusing portion, the light diffusing portion sufficient for diffusing and emitting diffused light derived from the coherent light provided by the coherent light source.

* * * * *